US012717778B2

(12) United States Patent
Indrieri et al.

(10) Patent No.: US 12,717,778 B2

(45) Date of Patent: Aug. 25, 2026

(54) METHODS AND SYSTEMS FOR PROMPT EVALUATION-BASED QUERY GENERATION

(71) Applicant: T-Mobile Innovations LLC, Overland Park, KS (US)

(72) Inventors: Timothy Indrieri, San Ramon, CA (US); Guangrui Su, Union City, CA (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 18/963,088

(22) Filed: Nov. 27, 2024

(65) Prior Publication Data

US 2026/0147754 A1 May 28, 2026

(51) Int. Cl.

| | |
|---|---|
| ***G06F 7/00*** | (2006.01) |
| ***G06F 16/242*** | (2019.01) |
| ***G06F 40/205*** | (2020.01) |
| ***G06F 40/295*** | (2020.01) |
| ***G06F 40/30*** | (2020.01) |
| ***G06N 20/00*** | (2019.01) |

(52) U.S. Cl.

CPC .......... *G06F 16/243* (2019.01); *G06F 40/205* (2020.01); *G06F 40/295* (2020.01); *G06F 40/30* (2020.01); *G06N 20/00* (2019.01)

(58) Field of Classification Search

CPC ............. G06F 16/3347; G06F 16/3344; G06F 16/332; G06F 16/24542; G06F 16/2455; G06F 16/24522; G06F 16/2456; G06F 16/2465; G06F 16/2471; G06F 16/24575; G06F 16/2453; G06F 16/2457; G06F 16/215; G06F 16/243; G06F 16/244; G06F 16/245; G06F 16/248; G06F 16/93; G06F 16/285; G06F 16/9535; G06F 16/3329; G06F 16/90332; G06F 16/90335; G06F 16/217; G06F 16/353; G06F 40/289; G06F 40/295; G06F 40/242; G06F 40/40; G06F 40/30; G06F 40/205; G06F 40/105; G06F 40/106; G06F 40/186; G06F 40/211; G06N 20/20

See application file for complete search history.

(56) References Cited

U.S. PATENT DOCUMENTS

| | | | | |
|---|---|---|---|---|
| 2011/0307504 | A1* | 12/2011 | Agrawal | G06F 16/90328 707/765 |
| 2024/0370727 | A1* | 11/2024 | Khani | G06F 40/40 |
| 2024/0404144 | A1* | 12/2024 | Aggarwal | G06N 3/045 |
| 2025/0200491 | A1* | 6/2025 | Anwade | G06Q 30/015 |
| 2025/0238113 | A1* | 7/2025 | Karanam | G06F 3/04815 |
| 2025/0292022 | A1* | 9/2025 | Raghavan | G06V 10/82 |

* cited by examiner

*Primary Examiner* — Mohammad A Sana

(57) ABSTRACT

A method comprises training a data model using training data, wherein the training data comprises labelled datasets indicating an intent associated with a plurality of different predefined prompts, receiving a prompt from a user equipment (UE) operated by user, extracting one or more keywords from the prompt, wherein the one or more keywords are respectively associated with one or more categories, and wherein the one or more categories are respectively associated with one or more databases, generating a query based on the one or more keywords, wherein the query includes one or more parameters based on the one or more keywords; and querying the one or more databases based on the query to retrieve data requested in the prompt.

20 Claims, 6 Drawing Sheets

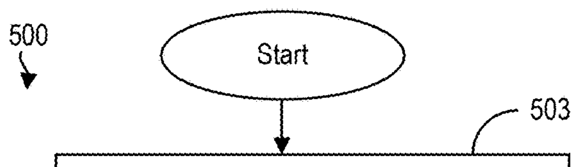

Training, by a data model application executing at a data processing system, a data model using training data, wherein the training data comprises labelled datasets indicating an intent associated with a plurality of different predefined prompts

Receiving, by the data model application, a prompt from a UE operated by user, wherein the prompt comprises text indicative of a request for data maintained across one or more databases in the communication network and communicatively coupled to the data processing system

Determining, by the data model application using a probabilistic application, an intent parameter set based on the prompt, wherein the intent parameter set indicates one or more attributes of the data being requested in the prompt

Parsing, by the data model application using a data extraction application running a Named Entity Recognition model, the prompt to extract one or more keywords associated with one or more categories based on the attributes in the intent parameter set, wherein the one or more categories are respectively associated with one or more of the one or more databases in the communication network

511

Generating, by the data model application using a query application, a query based on the intent parameter set and the one or more keywords, wherein a type of the query is based on the intent parameter set, and wherein the query includes one or more parameters based on the one or more keywords

513

Querying, by the data model application using the query application, the one or more databases based on the query to retrieve the data requested in the prompt

515

Transmitting, by the data model application using the query application, a response based on the data to the user equipment

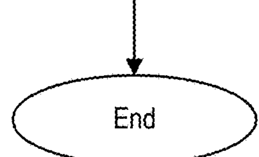

FIG. 5

METHODS AND SYSTEMS FOR PROMPT EVALUATION-BASED QUERY GENERATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Data models, such as generative artificial intelligence models, designed may be designed to respond to prompts with content, such as text, images, music, or code. Popular data models, like GPT for text and DALL-E for images, use deep learning techniques, particularly neural networks, to generate responses. Data models may employ probabilistic methods to predict and build relevant outputs by sampling from distributions learned in training. Applications for generative data models range from chatbots and virtual assistants to creative fields like art and storytelling.

SUMMARY

In an embodiment, a method for prompt evaluation-based query generation in a communication network is disclosed. The method comprises training, by a data model application executing at a data processing system, a data model using training data, in which the training data comprises labelled datasets indicating an intent associated with a plurality of different predefined prompts. The method further comprises receiving, by the data model application, a prompt from a user equipment operated by user, in which the prompt comprises text indicative of a request for data maintained across one or more databases in the communication network and communicatively coupled to the data processing system, and determining, by the data model application using a probabilistic application, an intent parameter set based on the prompt, in which the intent parameter set indicates one or more attributes of the data being requested in the prompt. The method further comprises parsing, by the data model application using a data extraction application running a Named Entity Recognition model, the prompt to extract one or more keywords associated with one or more categories based on the intent parameter set, in which the one or more categories are respectively associated with one or more of the one or more databases in the communication network, and generating, by the data model application using a query application, a query based on the intent parameter set and the one or more keywords, in which a type of the query is based on the intent parameter set, and wherein the query includes one or more parameters based on the one or more keywords. The method further comprises querying, by the data model application using the query application, the one or more databases based on the query to retrieve the data requested in the prompt, and transmitting, by the data model application using the query application, a response based on the data to the user equipment.

In another embodiment, a data processing system is disclosed. The data processing system comprises a non-transitory memory, a processor communicatively coupled to the memory, and an application stored at the memory. The application, when executed by the processor, causes the processor to be configured to train a data model using training data, in which the training data comprises labelled datasets indicating an intent associated with a plurality of different predefined prompts, receive a prompt from a user equipment operated by user, determine a score for each word in the prompt, determine an intent parameter set based on the score for each word in the prompt, in which the intent parameter set indicates one or more attributes of data being requested in the prompt, extract one or more keywords from the prompt, in which the one or more keywords are respectively associated with one or more categories, and the one or more categories are respectively associated with one or more databases, generate a query based on the intent parameter set and the one or more keywords, in which a type of the query is based on the intent parameter set, and the query includes one or more parameters based on the one or more keywords, query the one or more databases based on the query to retrieve data requested in the prompt.

In yet another embodiment, a method is disclosed. The method comprises training, by a data model application executing at a data processing system, a data model using training data, in which the training data comprises labelled datasets indicating an intent associated with a plurality of different predefined prompts, receiving, by the data model application, a prompt from a user equipment (UE) operated by user, extracting, by the data model application, one or more keywords from the prompt, in which the one or more keywords are respectively associated with one or more categories, and the one or more categories are respectively associated with one or more databases, generating, by the data model application, a query based on the one or more keywords, in which the query includes one or more parameters based on the one or more keywords, and querying, by the data model application, the one or more databases based on the query to retrieve data requested in the prompt.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 5 is a flowchart of a second method of prompt evaluation-based query generation according to various embodiments of the disclosure.

DETAILED DESCRIPTION

Figure 1:
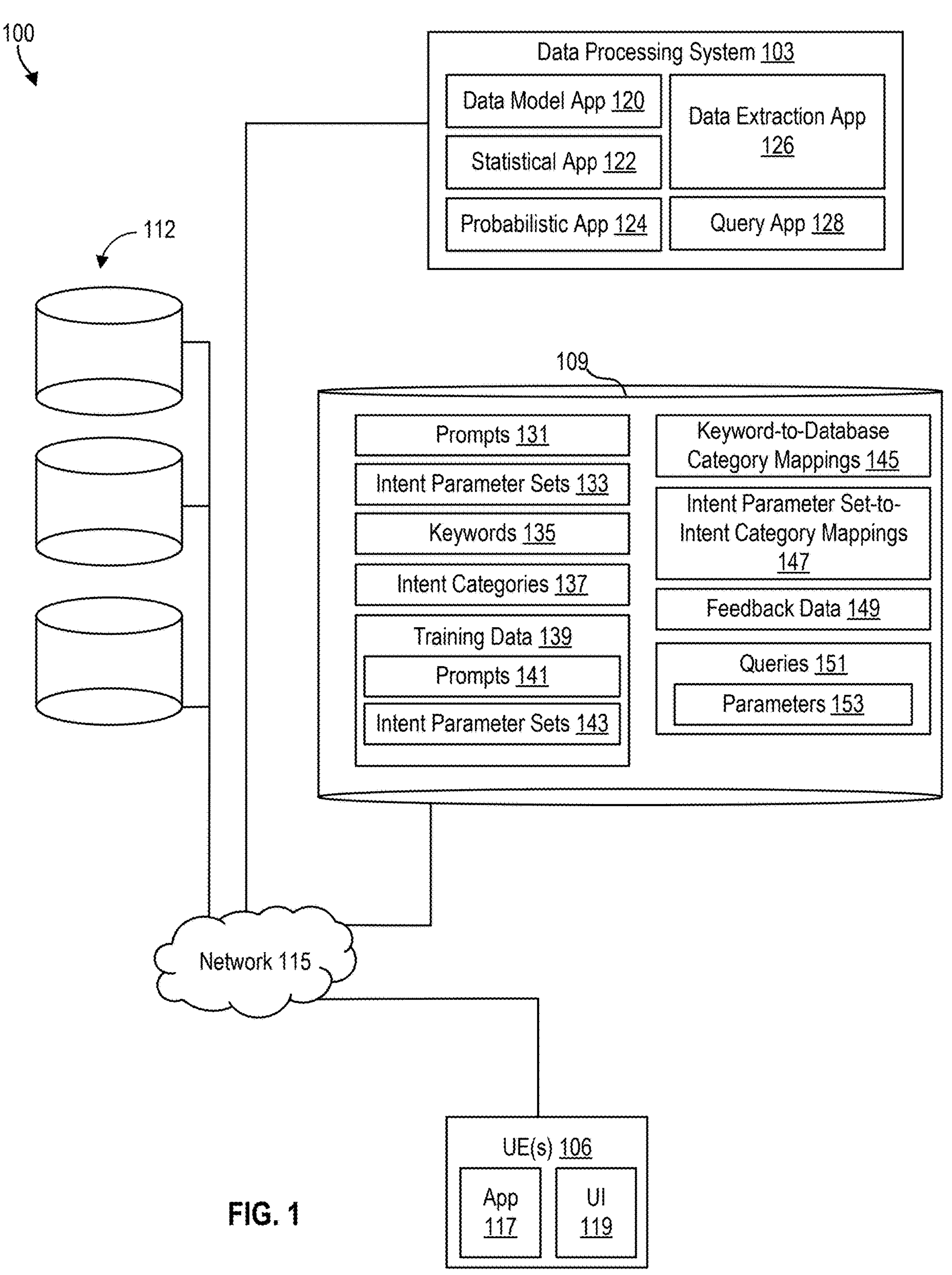
FIG. 1 is a block diagram of a communication network for prompt evaluation and query generation according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Artificial intelligence (AI)/machine learning models may be trained on extensive datasets, allowing the models to learn patterns, structures, and contexts to produce realistic and sometimes, coherent outputs. As mentioned above, these models may use deep learning techniques, such as neural networks, to generate responses based on prompts.

A prompt may refer to an input (in the form of text or audio) provided by a user that guides a model in generating a response, and may specify a content or type of information the user is seeking. For example, a prompt can be a question, a phrase, a sentence, or even a detailed description, depending on the type of output desired. The model may interpret the language, context, and cues to produce a relevant and coherent response. A well-crafted prompt may help the model understand a user's intent more precisely, often leading to more accurate or creative outputs. For example, the words in the prompt may help the model identify intent by providing context, specific keywords, and phrasing that align with the learned patterns of the model. This information may help the model predict the most relevant type of response, by mapping elements of the prompt to similar patterns and sequences encountered during training.

However, data models may not be trained with industry and/or enterprise specific terminology (e.g., trained with the true definition of phrases, terms, names, identifiers, etc., used across an industry or enterprise), and as such, these models may often not accurately respond to prompts including industry and/or enterprise-specific terminology. For example, the telecommunications industry uses various terms and identifiers that may not be known or understood by AI models. Similarly, the terms and identifiers used within a specific business enterprise may also not be known or understood by AI models. However, AI models used in these industries and business enterprises may receive prompts including the terms and identifiers that may be specific to the industry and/or enterprise, even though these AI models may not understand the true definition behind these terms and identifiers.

For example, a telecommunications service provider (TSP) company may use an AI model for various purposes based on the data maintained by the company servers. Employees of the TSP company may input prompts with terminology that is well-known within the company to identify network elements (e.g., cell sites, macro cells, micro cells, sectors, markets, etc.) and/or network attributes (e.g., VoLTE drops, low signal strength, etc.) into AI models expecting the AI models to understand and respond with the accurate data. Similarly, the medical industry may have certain well-known terms/phrases used for medical facility management and patient care/management. Medical practitioners and staff may input these terms/phrases as prompts into the AI models, but may not receive accurate responses from the AI models because the AI models may not understand the true intent behind the prompts.

Therefore, many AI models may be ineffectively trained because the models are not trained to understand the meaning behind industry and/or enterprise specific terms, phrases, and identifiers in the prompts, because the true meaning behind these terms, phrases, and identifiers may not be generally available to the public (and thus, hard to obtain). When the AI model does not understand the meaning behind a term, phrase, or identifier in a prompt, the AI model may not be capable of accurately identifying the intent, content, or request behind the prompt since the terms, phrases, and identifiers may not be mapped to patterns/sequences encountered during training.

The present disclosure addresses the foregoing technical problems by providing a technical solution in the technical field of data processing systems and data model enhancement. In an embodiment, industries and enterprises may use data processing systems running enhanced data models (e.g., trained based on machine learning, neural networking, or other AI-based schemes). The enhanced data models (sometimes referred to hereinafter as "data models") be trained based on robust industry and/or enterprise specific data, to more determine evaluate the words of the prompt and understand an intent behind the prompt. For example, the data model may be trained with a vast amount of labelled industry/enterprise-specific data (e.g., telecommunications specific data, including identifiers of specific cell sites, cells, markets, regions, sectors, frequency bands, etc.) and historical data regarding prior prompts and corresponding intents.

The data processing system may include a collection of one or more servers or computer systems, which may operate to run an AI-based data model application. The data model application may be an application (e.g., including both software and hardware components) designed to generate database queries (and in some cases, human-understandable responses) based on patterns learned from prompt-related training data. The training data may include labelled datasets indicating an intent associated predefined prompts. For example, the training data may include known correlations between historical prompts and intent parameter sets defining an intent behind each prompt and labelled parameters and attributes defining terms that may be used in the prompts.

An intent parameter set may include one or more parameters that together may be associated with an intent category, defining an intent behind a prompt. For example, the training data may include a pairing between a prompt reciting the phrase "trend 2500 buffer UEs for SV00557A2," and the associated intent parameter set including the parameters "trend N2500 BUE." In this case, the intent parameter set includes terms extracted from the prompt (e.g., "trend" and "2500") and a term generated based on the prompt (e.g., "BUE," which may represent buffered UEs). The terms in the intent parameter set may represent both the type of content queried in the prompt, and specific parameters for the type of content queried (e.g., a trend of buffered UEs operating on the 2500 frequency band). The training data may include numerous (tens, hundreds, thousands, etc.) pairs of prompts and corresponding intent parameter sets, such that the data processing system may use machine learning, deep learning, neural networking, and/or other AI-based model to determine patterns and trends between different prompts and corresponding intent parameter sets, to determine intent parameter sets for incoming new prompts.

The training data may also be based on historical data associated with prior prompts and feedback data received by the system regarding the accuracy or inaccuracy of the database query/output generated based on the prior prompts. The training data may also include labelled datasets indicating identifiers, terms, and phrases specific to the industry/enterprise. For example, labelled datasets may include identifiers of different cell sites and/or sectors, commonly used names/identifiers referring to different frequency bands, commonly used terms/phrases identifying different geographic areas/regions/markets, commonly used terms/phrases for different types of data, etc.

The data model application may communicate with (or include) a statistical application, a probabilistic application, a data extraction application, and a query application. The aforementioned training data may be used to train the data model application, the statistical application, the probabilistic application, the data extraction application, and/or the query application. The statistical application may be trained to measure the importance of words in a prompt (using the machine learning methods programmed at the data processing system) and generate a score indicative of the importance of each word in the prompt. For example, the statistical application may run a Term Frequency-Inverse Document Frequency (TF-IDF) method to measure the importance of each word in the prompt by first counting how often a word appears in the prompt and then determining a score of common words by measuring how frequently the words appear across multiple prior prompts (as indicated in the historical data used to train the statistical application). The higher the score of a word, the more likely that the word is significant in the prompt and representative of an intent of the prompt.

The probabilistic application may use probability distributions to classify the words in the prompt and determine an intent parameter set for the prompt. As mentioned above, the training data includes numerous pairs of prompts and corresponding intent parameter sets, which may be used to train the probabilistic application to generate an intent parameter set for a current prompt. The intent parameter set may include one or more terms (obtained from the prompt or generated based on the prompt) indicative of an intent behind the prompt. The intent may refer to the underlying purpose or goal behind a prompt input by a user, and the intent may guide the type of database query and/or response requested by the user.

Each intent parameter set may map to an intent category, which may be a classification label representing the intent of the prompt. For example, when a prompt is evaluated, the probabilistic application may calculate the probability of the prompt fitting into each category based on the intent parameter set and/or the occurrence of relevant words within each intent category. The intent category with the highest probability may be selected as the most likely intent behind the prompt. In an embodiment, the probabilistic application may run a Multinomial Naive Bayes (NB) model to classify the words/text in the prompt to identify the intent parameter sent and thus the intent behind the prompt.

The data extraction application may identify and label specific keywords in the prompt that may be used to respond to the prompt. The data extraction application may be trained using the labelled data sets (e.g., with commonly used terms, phrases, identifiers, etc., specifically associated with the applicable industry and/or enterprise). The data extraction application may use various AI-based methods, such as natural language processing and named entity recognition (NER) to extract keywords (such as identifiers, terms, phrases specific to the industry/enterprise, names, dates, locations, organizations, and more) from the prompt. The data extraction application may determine the keywords in the prompt based on the score of the words determined by the statistical application and the intent parameter set/intent category determined by the probabilistic application. The data extraction application may also determine the keywords based on the types of parameters that may be added to relevant database queries. For example, the data extraction application determines a type of query based on the intent parameter set/intent category, determine the parameters of the type of query, and identify keywords from the prompt that may be used as the parameters.

The query application may be trained to generate a database query (e.g., Structured Query Language (SQL) query) based on the intent parameter set/intent category determined by the probabilistic application and the keywords determined by the data extraction application. The type of database query (e.g., the type of content requested by prompt/the type of operation requested by the prompt) may be based on the intent parameter set/intent category. As different types of database queries may have different parameters, the query application may determine the parameters for the determined type of database query. The parameters to include in the database query may be based on the keywords extracted by the data extraction application (e.g., the parameters may be the keywords or derived from the keywords). In this way, the query application may map the natural language prompt received by the data processing system into database scheme used to generate the database query.

The query application may then determine the databases from which to pull the data requested in the prompt using the database query. For example, the identified keywords may map to or correspond with one or more databases (or columns, rows, entries in the databases). The query application may use the database query across the databases (or columns, rows, entries in the databases) that correspond to the keywords in the database query. The query application may then query one or more databases associated with the industry/enterprise using the database query to retrieve the data requested in the prompt.

The query application may in some cases generate a human-readable and/or human-understandable text response (e.g., using generative AI-schemes) carrying the data retrieved using the database query. The query application may transmit the response back to the requesting UE. The requesting UE may present the response (e.g., in text, voice, image, video, etc.) on a display of the UE.

Using the aforementioned applications, the data processing system may receive a prompt from a UE. In some cases, the prompt may include a request for information stored as data across one or more databases accessible by the data processing system. The prompt may include one or more identifiers, terms, and/or phrases that are known in the industry or to a business enterprise, but may not be general knowledge accessible to those outside of the industry or the business enterprise.

The data model application may pass the prompt to the statistical application to evaluate the words and/or phrases in the prompt and assign a score to each of the words and/or phrases, to determine a significance of each of the words in the prompt. The probabilistic application may determine an intent parameter set (and a corresponding intent category) based on the score of each word as determined by the statistical application. The data extraction application may extract keywords from the prompt based on the intent parameter set and/or the score of each word. The query application may determine a type of database query, the databases/tables to query, and the parameters of the query based on the intent parameter set, intent category, keywords, and other attributes of the words in the prompt. For example, the query application may determine the type of query based on the intent parameter set and determine the databases to query and the parameters of the query based on the keywords.

The query application may generate the database query and then query one or more of the databases to obtain the information to respond to the prompt. The query application may transmit the raw data back to the requesting UE, or the query application may package the data in a human-understandable format (e.g., using a generative AI-scheme) and transmit the human-understandable data back to the UE.

In this way, the data processing system running various applications, statistical models, probabilistic models, and AI-based models may be trained to evaluate prompts more accurately, which ultimately provides a more accurate response back to the requesting UE. Since the data processing system disclosed herein understands the terms, phrases, and identifiers of the prompt, and thus the intent behind the prompt, more accurately, the user may not need to input different versions of the same prompt repeatedly into the local application (e.g., chatbot application) to retrieve an accurate result. Instead, the data processing system (and the aforementioned applications) are trained to provide a more accurate result early on, thereby preventing the user from having to flood the network with repetitive prompts requesting the same, but more accurate information. By reducing the number of prompts flooding the network, the embodiments disclosed herein increase the capacity in the network (e.g., both processing and communication resources).

Turning now to FIG. 1, a communication network 100 is described. The communication network 100 includes a data processing system 103, one or more UEs 106, a data store 109, one or more databases 112, and a network 115. The network 115 may be one or more private networks, one or more public networks, or a combination thereof. While the data processing system 103, data store 109, and databases 112 are shown as separate from the network 115 in FIG. 1, it should be appreciated that the data processing system 103, data store 109, and databases 112 may be included as part of the network 115 in various embodiments. While the data store 109 and databases 112 are shown as separate from the data processing system 103, in some embodiments, the data processing system 103 may include the data store 109 and/or the databases 112.

The UEs 106 may refer to a device running an application 117 and including a display configured to display a user interface (UI) 119 through which a user may interact with the application 117. The application 117 may be an interface through which a user may enter a prompt (via the UI 119—by manually typing, or speaking the prompt into a microphone of the UE 106) to interact with the data processing system 103. The application 117 may be a web or mobile application, chatbot interface, or virtual assistant, designed to receive prompts, relay the prompts to the data processing system 103, and display the response received from the data processing system 103. Examples of UEs 106 may include smartphones, tablets, laptops, Internet of Things (IoT) devices, wearable devices, etc.

The data processing system 103 may be system (e.g., a set of servers including a collection of memory, processing, and communication resources) responsible for receiving prompts from UEs 106, evaluating the prompts, and providing a response to the UEs 106, as further described herein. The data processing system 103 may include a data model application 120, a statistical application 122, a probabilistic application 124, a data extraction application 126, and a query application 128. The data model application 120 may be trained to use the statistical application 122, probabilistic application 124, data extraction application 126, and query application 128 to evaluate prompts received from UEs 106 and respond to the prompts. For example, the data model application 120 may be trained to use the statistical application 122 to evaluate each word in the prompt and determine a score for each word in the prompt. The statistical application 122 may use a Term Frequency-Inverse Document Frequency (TF-IDF) method to evaluate and score each word in the prompt. The data model application 120 may be trained to use the probabilistic application 124 to determine an intent parameter set defining an intent of the prompt and a corresponding intent category of the prompt. The probabilistic application 124 may run a Multinomial Naive Bayes (NB) model to evaluate the prompt and determine an intent parameter set/intent category for the prompt. The data model application 120 may be trained to use the data extraction application 126 to extract keywords from the prompt based on the score of each word in the prompt and/or the intent parameter set. The data extraction application 126 may use a Named Entity Recognition (NER) model to extract and label keywords from the prompt. The data model application 120 may use the query application 128 to determine the databases to query based on the keywords, generate a query (e.g., SQL query) including the keywords as parameters of the query, query the databases 112 using the generated query to obtain requested data, generate a response to the prompt based on the requested data, and transmit the response to the requesting UE. The data model application 120, statistical application 122, probabilistic application 124, data extraction application 126, and query application 128 may be trained to run using one or more AI-based models, or predictive models.

A predictive model (also referred to herein as "data model") may refer to a machine learning model (e.g., neural networking model, deep learning model, natural language processing model, etc.) that leverages algorithms and statistical techniques to analyze input features of and identify patterns to score words in prompts, determine intent parameter sets of prompts, extract keywords from prompts, and generate database queries to retrieve the information requested in the prompts. The data model may be implemented using software (e.g., algorithms, logic, and code) stored across one or more memories, and the underlying hardware of the data processing system 103 may provide the computational resources for execution of the data model. The data model may be implemented as one or more different types of models using, for example, linear regression, decision trees, support vector machines, neural networks, or ensemble methods. It should be appreciated that any type of data model may be used, and the underlying algorithms, computations, and machine learning libraries used by the data model should not be limited herein. As described herein, the data model may be trained using data stored at the data store 109.

The data store 109 may be a collection of one or more memories (co-located or distributed across different data centers), which are accessible by the data processing system 103. As shown in FIG. 1, the data store 109 may store prompts 131, intent parameter sets 133, keywords 135, intent categories 137, training data 139, keyword-to-database category mappings 145, intent parameter set-to-intent category mappings 147, feedback data 149, and generated queries 151 (also referred to herein as database queries). It should be appreciated that the data store 109 may store other data that may be used by the data model application 120 for training and responding to prompts 131.

The prompt 131 may refer to the initial input provided by the user of the UE 106 (via the UI 119 and the application 117 at the UE 106). A prompt 131 may be in the form of text (e.g., typed directly by the user) or voice (e.g., spoken and then converted to text through speech-to-text methods at the data processing system). A prompt 131 may include words that convey an intent behind the prompt, such as specific keywords, topics, questions, or commands that may guide the data model application 120. The prompt 131 may also include contextual information, such as, for example, identifiers, names, dates, locations, or descriptive terms that may help clarify the request. For example, the prompt 131 may include terms, phrases, and/or identifiers that are known by users in an industry or in a business enterprise (e.g., cell site identifiers, sector identifiers, frequency band identifiers when the prompt 131 is based on a telecommunications request, or doctor names, medical equipment identifiers, shorthand names for medical conditions, diagnoses, treatments, etc., when the prompt is based on a medical request). The prompt 131 may also include action words that instruct the data model application 120 on the desired response type.

An intent parameter set 133 may include one or more parameters that together may be associated with an intent category 137, both defining an intent behind a prompt 131. The intent may refer to the underlying purpose or goal behind a prompt 131 input by a user, and the intent may guide the type of database query and/or response requested by the user. For example, intent parameter set 133 may include terms extracted from the prompt and/or a term generated based on the prompt. The terms in the intent parameter set 133 may represent both the type of content queried in the prompt, and specific parameters for the type of content queried.

Multiple different prompts 131 may correspond to the same intent parameter set 133. For example, the prompt 131 reciting "trend n2500 buffer ue for SV00557A2" and the prompt 131 reciting "show trend n2500 bue for SV00557A2" may both have the same intent, and thus be associated with the same intent parameter set 133 "trend n2500 BUE" (e.g., in which "trend" refers to the requested type of data, "N2500' may refer to a frequency band, and "BUE" may refer to a number of buffered UEs). As should be appreciated, different prompts 131 may also refer to different intent parameter sets 133.

Each intent parameter set 133 may directly or indirectly correspond to one or more intent categories 137. The intent category 137 may be a classification label representing the intent of the prompt 131. For example, one or more parameters in the intent parameter set 133 may be associated with a classification label of an intent category 137. The association between intent parameter sets 133 (or parameters in the intent parameter sets 133) and intent categories 137 may be predefined and/or determined by the data model application 120 based on training. The association between intent parameter sets 133 (or parameters in the intent parameter sets 133) and intent categories 137 may be defined in the intent parameter set-to-intent category mappings 147.

The keywords 135 may be identified by the data extraction application 126 and may include specific, meaningful elements or words within the prompt 131. In an embodiment, the keywords 135 may be determined based on the parameters to be added to a determined type of database query. In some cases, each keyword 135 may be grouped into categories for ease of understanding by the data model application 120. In some embodiments, one or more keywords 135 may be associated with particular databases 112 (e.g., columns in a database, entries in a database, etc.). For example, an identifier of a cell site may be known to be indicated in columns across one or more databases, and the identifier of the cell site may be extracted as a keyword 135. In this way, the identifier of the cell site may be mapped to the columns across the one or more databases 112. The association between different keywords 135 and different databases 112 (e.g., or specific columns, rows, entries in the databases 112) may be maintained in the keyword-to-database category mappings 145.

The training data 139 may include pairs of labelled prompts 141 and corresponding, labelled intent parameter sets 143, which may be used to train the data model application 120, statistical application 122, probabilistic application 124, data extraction application 126, and/or query application 128 of the data processing system 103. The feedback data 149 may include data obtained from UEs 106, for example, indicating whether a response received from the data processing system 103 is accurate or inaccurate (e.g., not reflecting the data requested by the user).

The queries 151 may refer to database queries (e.g., SQL queries) generated by the query application 128 based on the prompt. A query 151 may include one or more parameters 153 defining specific values and conditions used to tailor the function of the query 151. For example, the parameters 153 may define columns in databases 112, values (e.g., actual data in the databases 112), conditions for filtering data, constraints that specify how many records to retrieve or a range of records to receive, etc. The parameters 153 may directly or indirectly correspond to the keywords 135 determined for a prompt 131.

The databases 112 may refer to an organized collection of data that stores information one or more types of data structures (e.g., tables, with rows and columns). Each database may represent a specific dataset with rows or records storing individual entries and columns representing different data fields or types. Databases 112 may manage information related to specific industries or enterprises, and thus may include some of the terms, phrases, and/or identifiers known in the industry/enterprise, but not otherwise generally known to the public. Each column in a database 112 may store one type of data, creating a structured scheme allowing queries 151 to retrieve, filter, update, and data efficiently. Data may be stored differently across the different databases 112, thereby reflecting different types of data that may be queried differently as well.

Figure 2:
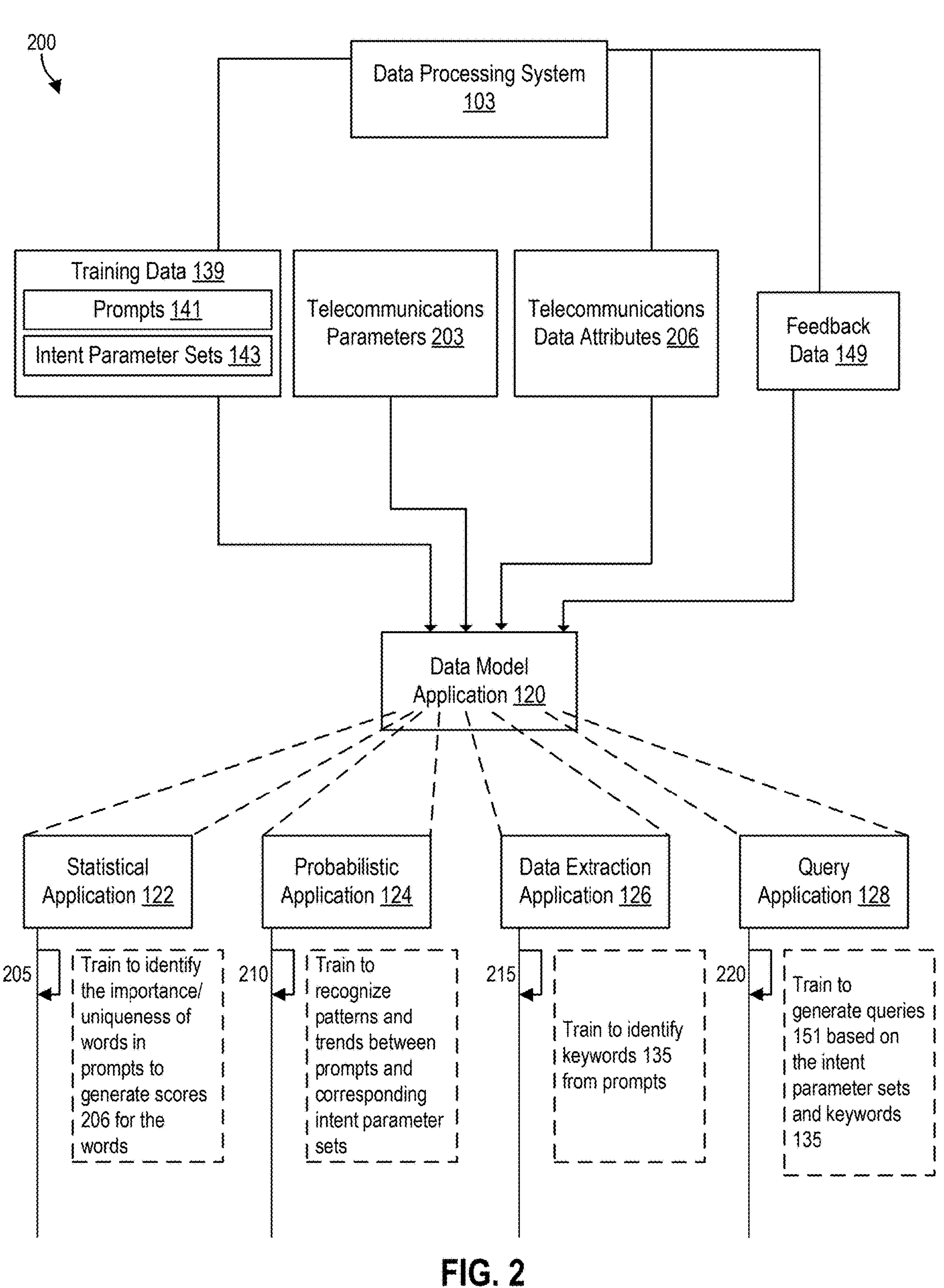
FIG. 2 is a diagram illustrating the training of a data model for prompt evaluation and query generation according to various embodiments of the disclosure.

Referring now to FIG. 2, shown is a diagram 200 illustrating the training of the data model application 120, statistical application 122, probabilistic application 124, data extraction application 126, and query application 128 according to various embodiments of the disclosure. As described above and shown in FIG. 2, the data model application 120 uses the statistical application 122, probabilistic application 124, data extraction application 126, and query application 128 during training and evaluation of prompts.

The data processing system 103 may obtain training data 139 and other types of training data to train the data model application 120, statistical application 122, probabilistic application 124, data extraction application 126, and query application 128. The training data 139 includes predefined, labelled prompts 141 and corresponding intent parameter sets 143, which the data model application 120, statistical application 122, and probabilistic application 124 may use to recognize patterns and trends between the different prompts 141 and corresponding intent parameter sets 143. Once the patterns and trends have been quantified into the algorithms, parameters, and weights provisioned at the data processing system 103, the data model application 120, statistical application 122, and probabilistic application 124 may be trained based on the training data 139.

The other types of training data that may be input into the data processing system 103 may include telecommunications parameters 203, telecommunications data attributes 206, and/or feedback data 149. The telecommunications parameters 203 may indicate terms, phrases, or identifiers indicative of the type of information being requested in a prompt 141. The telecommunications parameters 203 may be based on the labelled telecommunication parameters 203 in the labelled prompts 141 or a separate labelled listing of terms, phrases, or identifiers indicative of the type of information being requested in a prompt 131. For example, the telecommunications parameters 203 may be terms indicative of whether the user is requesting site capacity information, network quality information, voice quality information. For example, a telecommunications parameters 203 may include the terms "buffered UE", "BUE," and "bue," which may be labelled as a "buffered UE/device" on the downlink. As another example, a telecommunications parameters 203 may include the terms "trend" and "show trends," which may be labelled as indicative of the type of information requested in prompts 131 including the aforementioned terms. As should be appreciated, when the prompt 131 is requesting non-telecommunications-related data, the parameters 203 may similarly be a labelled listing of terms that are indicative of the type of information being requested in a prompt 131.

The telecommunications data attributes 206 may refer to identifiers and shorthand terminology used to identify and/or describe specific telecommunications network or subscriber attributes. For example, the telecommunications data attributes 206 may include identifiers (or shorthand terms) identifying cell sites, network elements, sectors, operative personnel, markets, regions, cells, frequency bands, and other attributes related to the telecommunications network and/or subscribers. For example, a telecommunications data attribute 206 may include the identifier "N2500" of a frequency band/channel, a telecommunications data attribute 206 may include the identifier "SV00557A2" of a telecommunications sector (e.g., coverage area), the telecommunications data attributes 206 may include the names of the different telecommunications regions (e.g., central, northeast, south, and west), etc. In this way, the telecommunications data attributes 206 may include the identifiers, names, or shorthand terms used to refer to various telecommunications attributes/elements. As should be appreciated, when the prompt 131 is requesting non-telecommunications-related data, the attributes 206 may similarly be a labelled listing of identifiers and the elements that may be included in a prompt 131.

The feedback data 149 may include data obtained from UEs 106, for example, indicating whether a response received from the data processing system 103 is accurate or inaccurate (e.g., not reflecting the data requested by the user). The feedback data 149 may also indicate whether the response sent to the UE 106 captured the intent behind the prompt 131. In some embodiments, the data used to train the data model application 120, statistical application 122, probabilistic application 124, data extraction application 126, and query application 128 may include historical data related to the prompts 131 received by the data processing system 103 over prior periods of time, and the corresponding intent parameter sets 133, keywords 135, and queries 151 determined based on the prompts 131. This historical data in combination with the feedback data 149 may be used to periodically re-train the algorithms and parameters of the data model to improve predictions made by the data model application 120, statistical application 122, probabilistic application 124, data extraction application 126, and query application 128.

During training, the data model application 120 may direct the training of one or more of the statistical application 122, probabilistic application 124, data extraction application 126, and/or query application 128 based on the training data 139, telecommunications parameters 203, telecommunications data attributes 206, and feedback data 149. As shown in FIG. 2, the data model application 120 may perform operation 205 to train the statistical application 122 to identify the importance and/or uniqueness of words in the prompts (labelled prompts 141 and historical prompts 131) to generate scores 206 for each word in incoming prompts 131. The data model application 120 may perform operation 210 to train the probabilistic application 124 to recognize patterns and trends between prompts (labelled prompts 141 and historical prompts 131) and corresponding intent parameter sets (labelled intent parameter sets 143 and historical intent parameter sets 133), and thus determine an optimal intent parameter set 131 for an incoming prompt 133. The data model application 120 may perform operation 215 to train the data extraction application 126 to identify and extract keywords 135 from prompts (labelled prompts 141 and historical prompts 131) based on the scores 206 of the words in the prompts and the intent parameter sets for the prompts. The data model application 120 may perform operation 220 to train the query application 128 to determine databases 112 to query based on the keywords 135, and generate queries 151 based on the identified keywords 135 and/or intent parameter sets (labelled intent parameter sets 143 and historical intent parameter sets 133). The query application 128 may be trained to identify keywords 135 based on parameters 153 that may be included in various database queries 151 (e.g., SQL queries).

Once the data model application 120, statistical application 122, probabilistic application 124, data extraction application 126, and query application 128 are trained, the data model application 120, statistical application 122, probabilistic application 124, data extraction application 126, and query application 128 may be used to evaluate incoming prompts 131 more accurately and efficiently. The data model application 120, statistical application 122, probabilistic application 124, data extraction application 126, and query application 128 may then query the databases 112 to retrieve the information requested in a prompt 131 and send the requesting UE 106 a response to the prompt 131.

Figure 3:
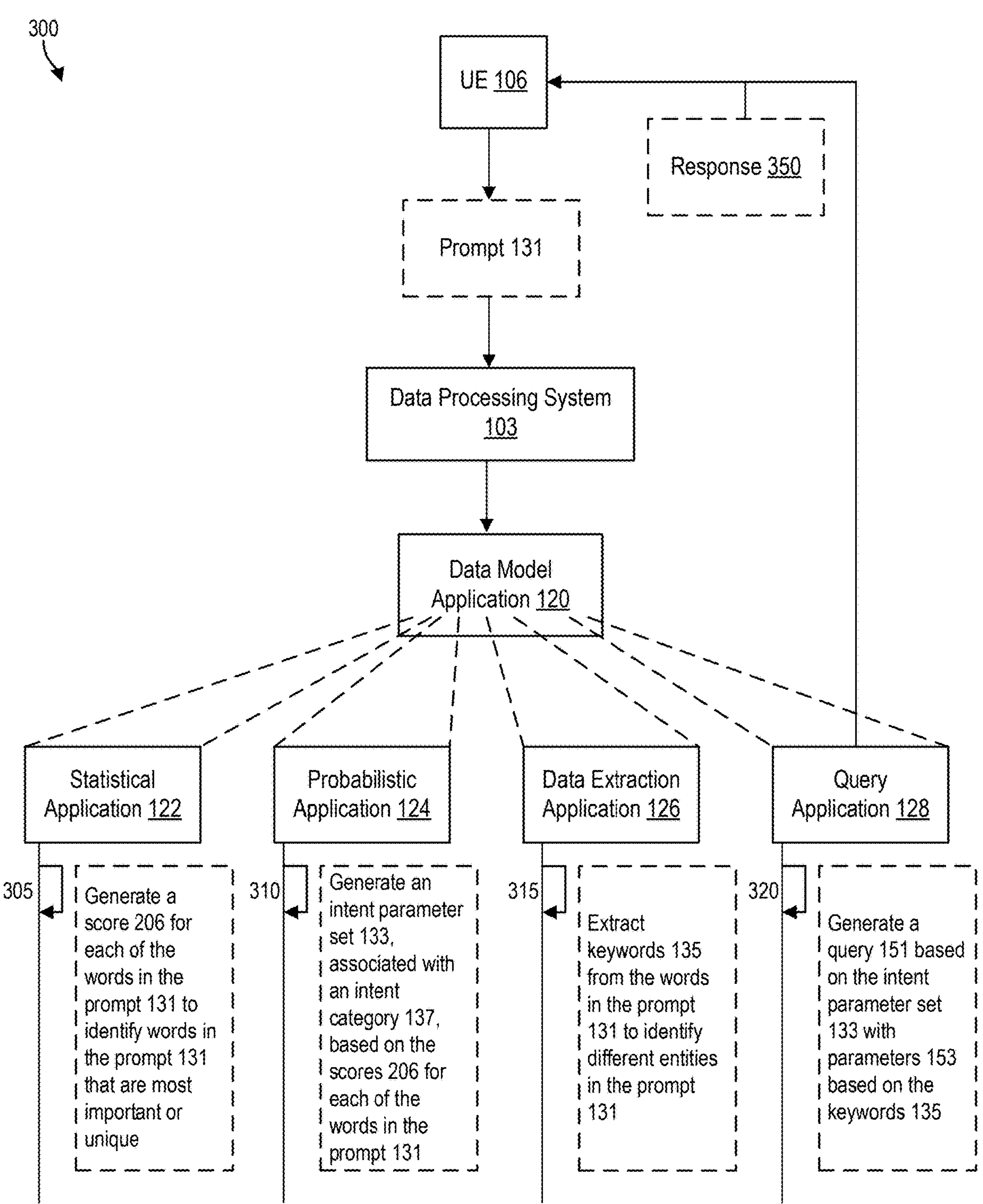
FIG. 3 is a diagram illustrating the use of the data model for prompt evaluation and query generation according to various embodiments of the disclosure.

Referring now to FIG. 3, shown is diagram 300 illustrating the use of the trained data model application 120, statistical application 122, probabilistic application 124, data extraction application 126, and query application 128 in the data processing system 112 to evaluate current prompts 131 received from UEs 106 according to various embodiments of the disclosure. A user operating the UE 106 may input a prompt 131 via the UI 119, and the application 117 may (in some cases convert the prompt 131 to text and) transmit the prompt 131 to the data processing system 103.

The data model application 120 may receive the prompt 131 and pass the prompt 131 through trained statistical application 122, probabilistic application 124, data extraction application 126, and query application 128 to respond to the prompt 131. The data model application 120 may use the statistical application 122 to perform operation 305, to generate a score 206 for each word in the prompt 131 and identify words in the prompt 131 that are most important or unique. As mentioned above, the statistical application 122 may run the TF-IDF algorithm to measure a score 206 based on how often a word appears in the prompt 131 (relative to the labelled prompts 141 and/or historical prompts 131). The score 206 for a word may be higher for more significant words indicative of the intent behind the prompt, and lower for common words that do not contribute to the intent behind the prompt.

The data model application 120 may use the probabilistic application 124 to perform operation 310, to generate an intent parameter set 133 for the prompt 131. The intent parameter set 133 may be associated with an intent category 137 (as indicated as the intent parameter set-to-intent category mappings 147). For example, the probabilistic application 124 may run the Multinomial NB model to evaluate the prompt 131 and determine the intent parameter set 133 (and corresponding intent category 137) for the prompt 131 based at least in part on the scores 206 for each of the words in the prompt 131. The intent parameter set 133 may be one or more parameters (or labels) taken directly from the prompt 131 and/or determined based on the words in the prompt 131, in which the parameters together indicate an intent (e.g., intent category 137) of the prompt 131. The intent parameter set 133 and the intent category 137 may classify the purpose or topic of the prompt 131, guiding the data model application 120 to generate the most accurate and relevant response to the prompt 131.

The data model application 120 may use the data extraction application 126 to perform operation 315, to extract keywords 135 from the words in the prompt 131 to identify different entities in the prompt 131. For example, the data model application 120 may run an NER and NLP model to evaluate the prompt 131 to determine the keywords 135 based on the scores 206, intent parameter set 133, and parameters 153 available for different queries 151. The keywords 135 may be identified based on the telecommunications parameters 203 and the telecommunications data attributes 206 trained at the data extraction application 126. The keywords 135 may correspond to names/identifiers of telecommunications data attributes 206, columns in databases 112, values (e.g., actual data in the databases 112), conditions for filtering data, constraints that specify how many records to retrieve or a range of records to receive, etc.

The keywords 135 may also each correspond to different categories (as indicated in the keyword-to-database category mappings 145), each of which may correspond to different databases 112 (or rows, columns, or entries in the databases 112). A keyword 135 reciting "macros" (from prompt 131) may be associated with a category indicated in the keyword-to-database category mappings 145. The category may be associated with a first number of databases 112 (or rows, columns, or entries in the databases 112) (e.g., five databases 112) (i.e., data related to the "macros" in different network domains may be stored across five different databases 112). Another keyword reciting "regions" (from prompt 131) may be associated with another category indicated in the keyword-to-database category mappings 145. This other category may be associated with a second number of databases 112 (or rows, columns, or entries in the databases 112) (e.g., four databases 112) (i.e., data related to the "regions" in different network domains may be stored across four different databases 112). In this way, the data extraction application 126 may also determine the databases 112 associated with each of the keywords 135 based on the keyword-to-database mappings 145.

The data model application 120 may use the query application 128 to perform operation 320, to determine the databases 112 to query, and generate a query 151 based on the intent parameter set 133 with the parameters 153 of the query 151 being based on the keywords 135. The determination of the databases 112 (or rows, columns, or entries in the databases 112) to query may be based on the determined categories (and associated databases 112) for each of the keywords 135. Continuing with example above, supposing the prompt 131 includes the keyword 135 reciting "macros" (with five databases 112) and the keyword 135 reciting "regions" (with four databases 112). The query application 128 may determine that only two databases 112 (or rows, columns, or entries in the databases 112) between the five databases 112 associated with "macros" and four databases 112 associated with "regions" may include information specific to both "macros" and "regions." The query application 128 may then determine that only the two overlapping databases 112 (or rows, columns, or entries in the databases 112) are to be queried to respond to the prompt 131. In this way, the embodiments disclosed herein reduce querying resources by identifying the specific elements of the databases 112 to query based on a prompt 131, in a manner to avoid expending resources in querying unnecessary elements in the databases 112 in an attempt to respond to a prompt 131.

Next, the query application 128 may evaluate the prompt 131 to determine the type of query 151 (e.g., the type of action to perform, the general type of content to retrieve, the databases 112 from which the retrieve data from, etc.) based on the intent parameter set 133 and the corresponding intent category 137. The parameters 153 of the query 151 may be based on the keywords 135 (e.g., the query 151 may be generated to include the keywords 135 as the parameters 153). For example, when the intent parameter set 133 is "trend N2500 BUE," the generated query 151 may recite "SELECT report_date, N2500_avg_active_users_dl FROM database WHERE sector IN ('{param}') {date_condition}ORDER BY report_date DESC."

The query application 128 may query the databases 112 using the query 115 to retrieve the corresponding data (as queried using the parameters 153 in the query 151). In an embodiment, the received raw data may be transmitted back to the UE 106 as a response 350. The raw data may be displayed at the UE 106. In another embodiment, the query application 128 may generate a human-understandable version of the raw data (e.g., using a generative AI model), and transmit the human-understandable version of the data to the UE 106 as the response 350. The human-understandable version of the data may be displayed at the UE 106.

As a first illustrative example, a prompt 131 may recite "how many macros in all regions?". The data model application 120 may evaluate the prompt 131 as described herein and generate a response 350. The response 350 may include, for example, descriptive text and/or a table, with a column for each of the different regions (central, northeast, south, west, etc.) and another column with the total macros for each region.

As a second illustrative example, a prompt 131 may recite "show me 5*g* region congestion." The response 350 may include, for example, descriptive text and/or a table, with a column for each of the different regions, another column for time periods during which the congestion was recorded, and another column for values representing the recorded congestion for each of the different regions within the mentioned time periods. The response 350 may also include a graph with lines representing the congestion across each of the different regions over different periods of time.

As a third illustrative example, a prompt 131 may recite "show trend n2500 bue for sector SV00557A2 from April to July 2024." The response 350 may include, for example, descriptive text and/or a table, with a column for time periods during which the buffered UE data was recorded, and another column for values representing the average active users in the downlink using the N2500 frequency band during the mentioned time periods. The response 350 may also include a graph with lines representing the data indicated in the table. In this way, the responses 350 include data specific to network domains because the embodiments disclosed herein train the data processing system 103 to evaluate data specific to network domains accurately and efficiently.

Figure 4:
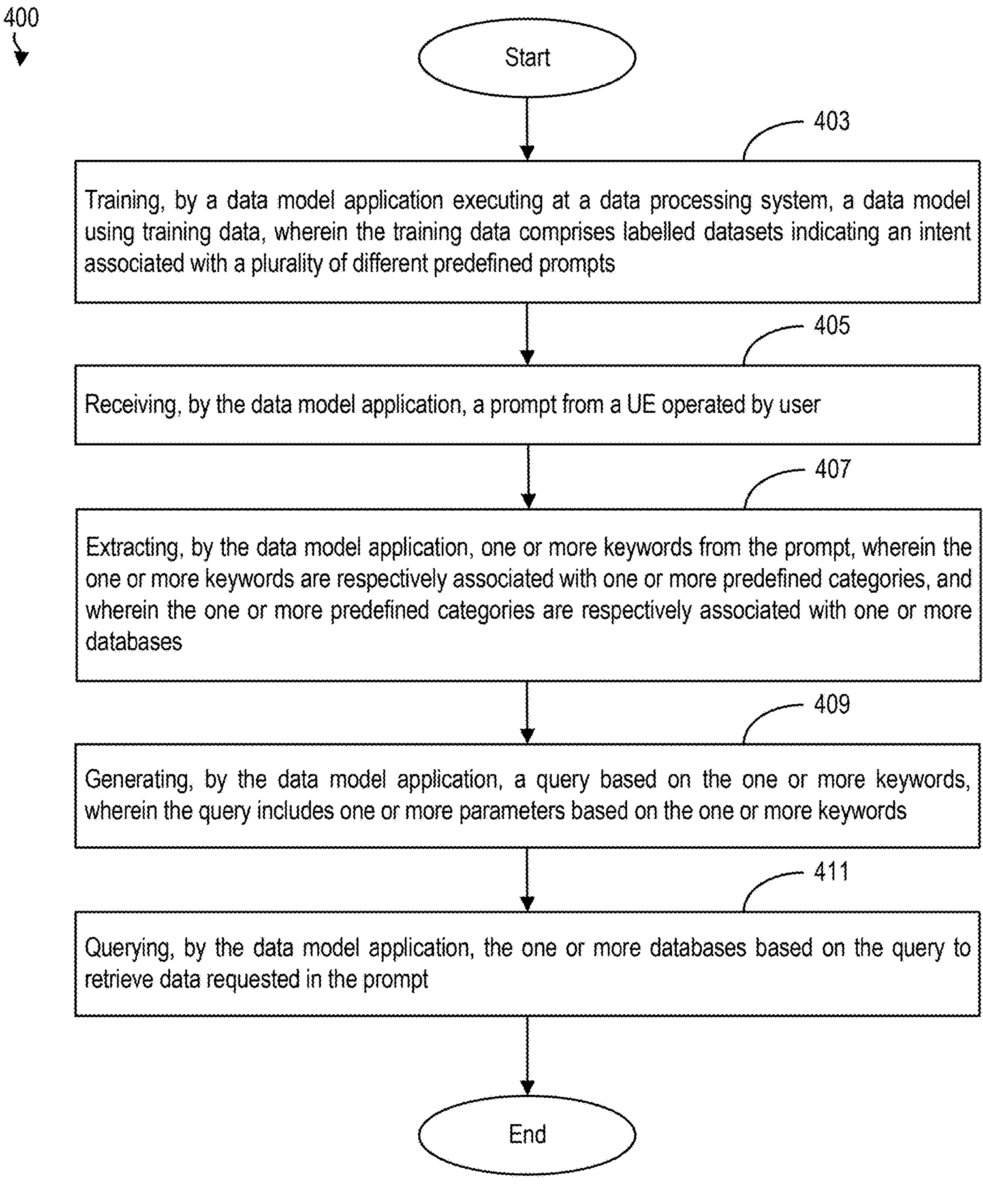
FIG. 4 is a flowchart of a first method of prompt evaluation-based query generation according to various embodiments of the disclosure.
Figure 6:
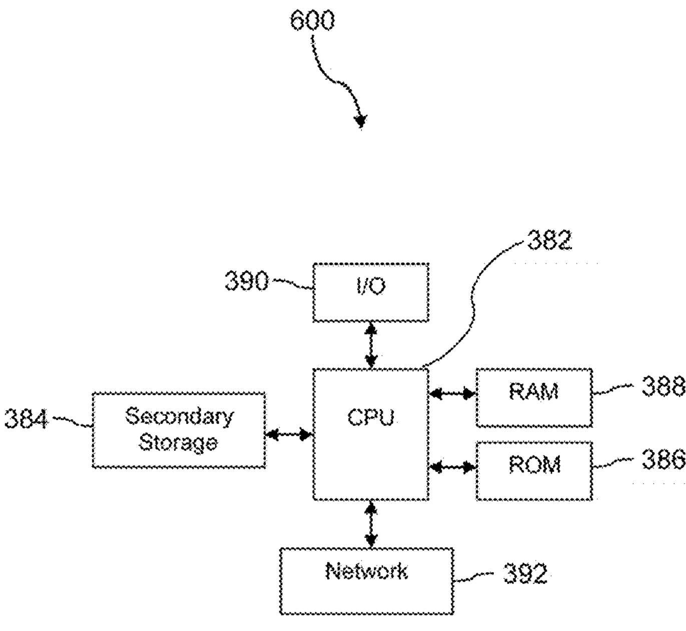
FIG. 6 is a block diagram of a computer system implemented within the communication network of FIG. 1 according to an embodiment of the disclosure.

Referring now to FIG. 4, shown is a method 400 of prompt evaluation and response generation in the communication network 100 of FIG. 1 according to various embodiments of the disclosure. Method 400 may be implemented by data processing system 103. In embodiments, the method 400 may be implemented using a computer system with components as shown in FIG. 6. As illustrated, method 400 of FIG. 4 includes a number of enumerated operations, but embodiments of the operations in FIG. 4 may include additional operations before, after, and in between the enumerated operations. In some embodiments, one or more of the enumerated operations may be omitted or performed in a different order.

At step 403, method 400 comprises training, by a data model application 120 executing at a data processing system 103, a data model using training data 139. The training data 139 comprises labelled datasets indicating an intent associated with a plurality of different predefined and prior prompts 131, 141. At step 405, method 400 comprises receiving, by the data model application 120, a prompt 131 from a UE 106 operated by user. At step 407, method 400 comprises extracting, by the data model application 120, one or more keywords 135 from the prompt 131. The one or more keywords 135 are respectively associated with one or more predefined categories, and the one or more predefined categories are respectively associated with one or more databases 112. At step 409, method 400 comprises generating, by the data model application 120, a query 151 based on the one or more keywords 135. The query 151 includes one or more parameters 153 based on the one or more keywords 135. At step 411, method 400 comprises querying, by the data model application 120, the one or more databases 112 based on the query 151 to retrieve data requested in the prompt 131.

Method 400 may include other steps and/or features that are not otherwise shown in FIG. 4. In an embodiment, the training data 139 further comprises telecommunications parameters 203 describing different types of information requested in the different predefined prompts 141, and/or telecommunications data attributes 206 including identifiers of different telecommunications elements. In an embodiment, wherein the one or more parameters 153 include at least one of columns, values, conditions, limits, or ranges determined based on the intent parameter set and the one or more keywords.

In an embodiment, the prompt 131 comprises text indicative of a request for data maintained across the one or more databases 112 in the communication network 100 and communicatively coupled to the data processing system 103. In an embodiment, the method may further comprises determining, by the data model application 120, a score 206 for each word in the prompt 131. The score 206 for each word in the prompt 131 indicates a relevance of a respective word to an intent of the prompt 131.

Referring now to FIG. 5, shown is a method 500 of prompt evaluation and response generation in the communication network 100 of FIG. 1 according to various embodiments of the disclosure. Method 500 may be implemented by data processing system 103. In embodiments, the method 500 may be implemented using a computer system with components as shown in FIG. 6. As illustrated, method 500 of FIG. 5 includes a number of enumerated operations, but embodiments of the operations in FIG. 5 may include additional operations before, after, and in between the enumerated operations. In some embodiments, one or more of the enumerated operations may be omitted or performed in a different order.

At step 503, method 500 comprises training, by a data model application 120 executing at a data processing system 103, a data model using training data 139. The training data 139 comprises labelled datasets indicating an intent associated with a plurality of different predefined prompts 131, 141. At step 505, method 500 comprises receiving, by the data model application 120, a prompt 131 from a UE 106 operated by user. The prompt 131 comprises text indicative of a request for data maintained across one or more databases 112 in the communication network 100 and communicatively coupled to the data processing system 103.

At step 507, method 500 comprises determining, by the data model application 120 using a probabilistic application 124, an intent parameter set 133 based on the prompt 131. The intent parameter set 133 indicates one or more attributes of the data being requested in the prompt 131. At step 509, method 500 comprises parsing, by the data model application 120 using a data extraction application 126 running a Named Entity Recognition model, the prompt 131 to extract one or more keywords 135 associated with one or more categories based on the attributes in the intent parameter set 131. The one or more categories are respectively associated with one or more of the one or more databases 112 in the communication network 100. At step 511, method 500 comprises generating, by the data model application 120 using a query application 128, a query 151 based on the intent parameter set 133 and the one or more keywords 135. A type of the query 151 is based on the intent parameter set 133, and the query 151 includes one or more parameters 153 based on the one or more keywords 135. At step 513, method 500 comprises querying, by the data model application 120 using the query application 128, the one or more databases 112 based on the query 151 to retrieve the data requested in the prompt 131. At step 515, method 500 comprises transmitting, by the data model application 120 using the query application 128, a response 350 based on the data to the UE 106.

Method 500 may include other steps and/or features that are not otherwise shown in FIG. 5. In an embodiment, the prompt 131 is a request for site capacity data at a cell site, a request for network quality data in a region, a request for voice quality data in the region, or a request for buffered user equipment (UE) data in a predefined sector. In an embodiment, the one or more attributes of the data being requested includes an identifier of at least one of a telecommunications cell site, cell, region, frequency band, sector, or market. In an embodiment, the training data 139 further includes identifiers of at least one of telecommunications cell sites, cells, regions, frequency bands, sectors, or markets.

In an embodiment, the labelled datasets of the training data 19 comprise a mapping between a first set of prompts 141 and the intent associated with each of the first set of prompts 141, in which the intent is a predefined intent parameter set 143 comprises one or more labels defining attributes of requested data in each of the first set of prompts 141. In an embodiment, generating the query 151 based on the intent parameter set 133 and the one or more keywords 135 comprises translating, by the data model application, the one or more keywords 135 in the prompt 141 to database schema across the one or more databases 112, in which the one or more parameters 153 in the query correspond to the database schema translated from the one or more keywords 135. In an embodiment, receiving, by the data model application 120, feedback data 149 indicative of whether the response accurately responded to the prompt 131. The feedback data 149 describes errors or corrections to the query 151 based on the prompt 131, and the feedback data 149 is used to augment the training data 139.

FIG. 6 illustrates a computer system 600 suitable for implementing one or more embodiments disclosed herein. In an embodiment, the data processing system 103, data store 109, and/or UEs 106, etc., may each be implemented as the computer system 600. The computer system 600 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 600, at least one of the CPU 382, the RAM 388, and the ROM 386 are changed, transforming the computer system 600 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 600 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 600 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 600 to provide the functionality of a number of servers that is not directly bound to the number of computers in the computer system 600. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 600, at least portions of the contents of the computer program product to the secondary storage 384, to the ROM 386, to the RAM 388, and/or to other non-volatile memory and volatile memory of the computer system 600. The processor 382 may process the executable instructions and/or data structures in part by directly accessing the computer program product, for example by reading from a CD-ROM disk inserted into a disk drive peripheral of the computer system 600. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 600.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 600 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for prompt evaluation-based query generation in a communication network, wherein the method comprises:

training, by a data model application executing at a data processing system, a data model using training data, wherein the training data comprises labelled datasets indicating an intent associated with a plurality of different predefined prompts;

receiving, by the data model application, a prompt from a user equipment operated by a user, wherein the prompt comprises text indicative of a request for data maintained across one or more databases in the communication network and communicatively coupled to the data processing system;

determining, by the data model application using a probabilistic application, an intent parameter set based on the prompt, wherein the intent parameter set indicates one or more attributes of the data being requested in the prompt;

parsing, by the data model application using a data extraction application running a Named Entity Recognition model, the prompt to extract one or more keywords associated with one or more categories based on the intent parameter set, wherein the one or more categories are respectively associated with one or more of the one or more databases in the communication network;

generating, by the data model application using a query application, a query based on the intent parameter set and the one or more keywords, wherein a type of the query is based on the intent parameter set, and wherein the query includes one or more parameters based on the one or more keywords;

querying, by the data model application using the query application, the one or more databases based on the query to retrieve the data requested in the prompt; and transmitting, by the data model application using the query application, a response based on the data to the user equipment.

2. The method of claim 1, wherein the prompt is a request for site capacity data at a cell site, a request for network quality data in a region, a request for voice quality data in the region, or a request for buffered user equipment (UE) data in a predefined sector.

3. The method of claim 1, wherein the one or more attributes in the intent parameter set includes an identifier of at least one of a telecommunications cell site, cell, region, frequency band, sector, or market.

4. The method of claim 1, wherein the training data further includes identifiers of at least one of telecommunications cell sites, cells, regions, frequency bands, sectors, or markets.

5. The method of claim 1, wherein the labelled datasets of the training data comprise a mapping between a first set of prompts and the intent associated with each of the first set of prompts, wherein the intent is a predefined intent parameter set comprising one or more labels defining attributes of requested data in each of the first set of prompts.

6. The method of claim 1, wherein generating the query based on the intent parameter set and the one or more keywords comprises translating, by the data model application, the one or more keywords in the prompt to database schema across the one or more databases, wherein the one or more parameters in the query correspond to the database schema translated from the one or more keywords.

7. The method of claim 1, further comprising receiving, by the data model application, feedback data indicative of whether the response actually captured the intent of the prompt, wherein the feedback data describes errors or corrections to the query based on the prompt, and wherein the feedback data is used to augment the training data.

8. A data processing system, comprising:

a non-transitory memory;

a processor communicatively coupled to the memory; and an application stored at the memory, which when executed by the processor, causes the processor to be configured to:

train a data model using training data, wherein the training data comprises labelled datasets indicating an intent associated with a plurality of different predefined prompts;

receive a prompt from a user equipment operated by a user;

determine a score for each word in the prompt;

determine an intent parameter set based on the score for each word in the prompt, wherein the intent parameter set indicates one or more attributes of data being requested in the prompt;

extract one or more keywords from the prompt, wherein the one or more keywords are respectively associated with one or more categories, and wherein the one or more categories are respectively associated with one or more databases;

generate a query based on the intent parameter set and the one or more keywords, wherein a type of the query is based on the intent parameter set, and wherein the query includes one or more parameters based on the one or more keywords; and query the one or more databases based on the query to retrieve data requested in the prompt.

9. The data processing system of claim 8, wherein the prompt comprises text indicative of a request for the data maintained across the one or more databases communicatively coupled to the data processing system.

10. The data processing system of claim 8, wherein the score for each word in the prompt indicates a relevance of a respective word to an intent of the prompt.

11. The data processing system of claim 8, wherein the application is further configured to determine an association between the intent parameter set and an intent category representing an intent of the prompt.

12. The data processing system of claim 11, wherein the application is further configured to extract the one or more keywords from the prompt based on the intent category representing the intent of the prompt.

13. The data processing system of claim 11, wherein the one or more parameters include at least one of columns, values, conditions, limits, or ranges determined based on the intent parameter set and the one or more keywords.

14. A non-transitory computer-readable medium having instructions stored thereon that, when executed by a processor, cause the processor to:

train a data model using training data, wherein the training data comprises labelled datasets indicating an intent associated with a plurality of different predefined prompts;

receive a prompt from a user equipment operated by a user;

determine a score for each word in the prompt;

determine an intent parameter set based on the score for each word in the prompt, wherein the intent parameter set indicates one or more attributes of data being requested in the prompt;

extract one or more keywords from the prompt, wherein the one or more keywords are respectively associated with one or more categories, and wherein the one or more categories are respectively associated with one or more databases;

generate a query based on the intent parameter set and the one or more keywords, wherein a type of the query is based on the intent parameter set, and wherein the query includes one or more parameters based on the one or more keywords; and query the one or more databases based on the query to retrieve data requested in the prompt.

15. The non-transitory computer-readable medium of claim 14, wherein the prompt comprises text indicative of a request for the data maintained across the one or more databases communicatively coupled to a data processing system.

16. The non-transitory computer-readable medium of claim 14, wherein the score for each word in the prompt indicates a relevance of a respective word to an intent of the prompt.

17. The non-transitory computer-readable medium of claim 14, wherein the instructions, when executed by the processor, further cause the processor to determine an association between the intent parameter set and an intent category representing an intent of the prompt.

18. The non-transitory computer-readable medium of claim 17, wherein the instructions, when executed by the processor, further cause the processor to extract the one or more keywords from the prompt based on the intent category representing the intent of the prompt.

19. The non-transitory computer-readable medium of claim 14, wherein the one or more attributes in the intent parameter set includes an identifier of at least one of a telecommunications cell site, cell, region, frequency band, sector, or market.

20. The non-transitory computer-readable medium of claim 14, wherein the one or more parameters include at least one of columns, values, conditions, limits, or ranges determined based on the intent parameter set and the one or more keywords.

* * * * *